(12) United States Patent
Hoggan

(10) Patent No.: US 8,850,187 B2
(45) Date of Patent: Sep. 30, 2014

(54) SUBSCRIBER CERTIFICATE PROVISIONING

(75) Inventor: Stuart A. Hoggan, Longmont, CO (US)

(73) Assignee: Cable Television Laboratories, Inc., Lousiville, CO (US)

( * ) Notice: Subject to any disclaimer, the term of this patent is extended or adjusted under 35 U.S.C. 154(b) by 194 days.

(21) Appl. No.: 13/473,745

(22) Filed: May 17, 2012

(65) Prior Publication Data

US 2013/0311771 A1 Nov. 21, 2013

(51) Int. Cl.
*G06F 7/04* (2006.01)
(52) U.S. Cl.
USPC .............................................. 713/156; 726/8
(58) Field of Classification Search
None
See application file for complete search history.

(56) References Cited

U.S. PATENT DOCUMENTS

| 730,850 | A | * | 6/1903 | Wood | 108/84 |
|---|---|---|---|---|---|
| 7,421,731 | B2 | * | 9/2008 | Mitchell et al. | 726/3 |
| 7,788,716 | B2 | * | 8/2010 | Dapkus et al. | 726/18 |
| 8,509,431 | B2 | * | 8/2013 | Schmidt et al. | 380/44 |
| 2003/0110374 | A1 | * | 6/2003 | Yamamoto et al. | 713/155 |
| 2003/0212892 | A1 | * | 11/2003 | Oishi | 713/168 |
| 2004/0030932 | A1 | * | 2/2004 | Juels et al. | 713/202 |
| 2006/0021019 | A1 | * | 1/2006 | Hinton et al. | 726/10 |
| 2006/0053296 | A1 | * | 3/2006 | Busboom et al. | 713/182 |
| 2006/0080352 | A1 | * | 4/2006 | Boubez et al. | 707/102 |
| 2008/0022086 | A1 | * | 1/2008 | Ho et al. | 713/155 |
| 2008/0059804 | A1 | * | 3/2008 | Shah et al. | 713/186 |
| 2008/0072301 | A1 | * | 3/2008 | Chia et al. | 726/8 |
| 2008/0259885 | A1 | * | 10/2008 | Faulkner et al. | 370/338 |
| 2011/0099367 | A1 | * | 4/2011 | Thom et al. | 713/156 |
| 2011/0158406 | A1 | * | 6/2011 | Marcia et al. | 380/200 |
| 2011/0202986 | A1 | * | 8/2011 | Horn et al. | 726/7 |

OTHER PUBLICATIONS

CL-SP-AUTHAPP-I01-120118, (CableLaBS Specification OnLine Content Access "Authentication and Authorization through Client Applications" CL-SP-AUTHAPP-I01-120118, Jan. 18, 2012).*
DPoE-SP-SECv1.0-I01-110225 (Cable Data Services, DOCSIS® Provisioning of EPON Specifications, "DPoE™ Security and Certificate Specification", DPoE-SP-SECv1.0-I01-110225, Feb. 25, 2011).*
Oracle (Oracle Fusion Middleware, Understanding Security for Oracle WebLogic Server 11g Release 1 (10.3.6), E13710-06, Oct. 3, 2006).*

* cited by examiner

*Primary Examiner* — Peter Poltorak
(74) *Attorney, Agent, or Firm* — Great Lakes Intellectual Property, PLLC

(57) ABSTRACT

Provisioning a device with a certificate is contemplated. The certificate may be used to verify whether the device or a user of the device is authorized to access electronic content, services, and signaling. The certificate may be provisioned in relation to the device having successfully completed a two-factor authentication process so that an entity providing the certificate need not have to repeat the two-factor authentication process.

15 Claims, 2 Drawing Sheets

SUBSCRIBER CERTIFICATE PROVISIONING

TECHNICAL FIELD

The present invention relates to certificate provisioning, such as but not limited to provisioning a subscriber device with a certificate to facilitate access to various electronic services.

BACKGROUND

A certificate may be issued by a certificate authority (CA) to a device, server, mobile phone, etc. A certificate provisioned device may rely on various attestations and representations within the certificate to identify itself for access to services, such as but not necessarily limited to identifying itself to a web server in order to gain to secure content. A digital certificate may be defined as a set of data signed by a trusted entity (e.g., a third-party certificate provider) that identifies an associated user.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
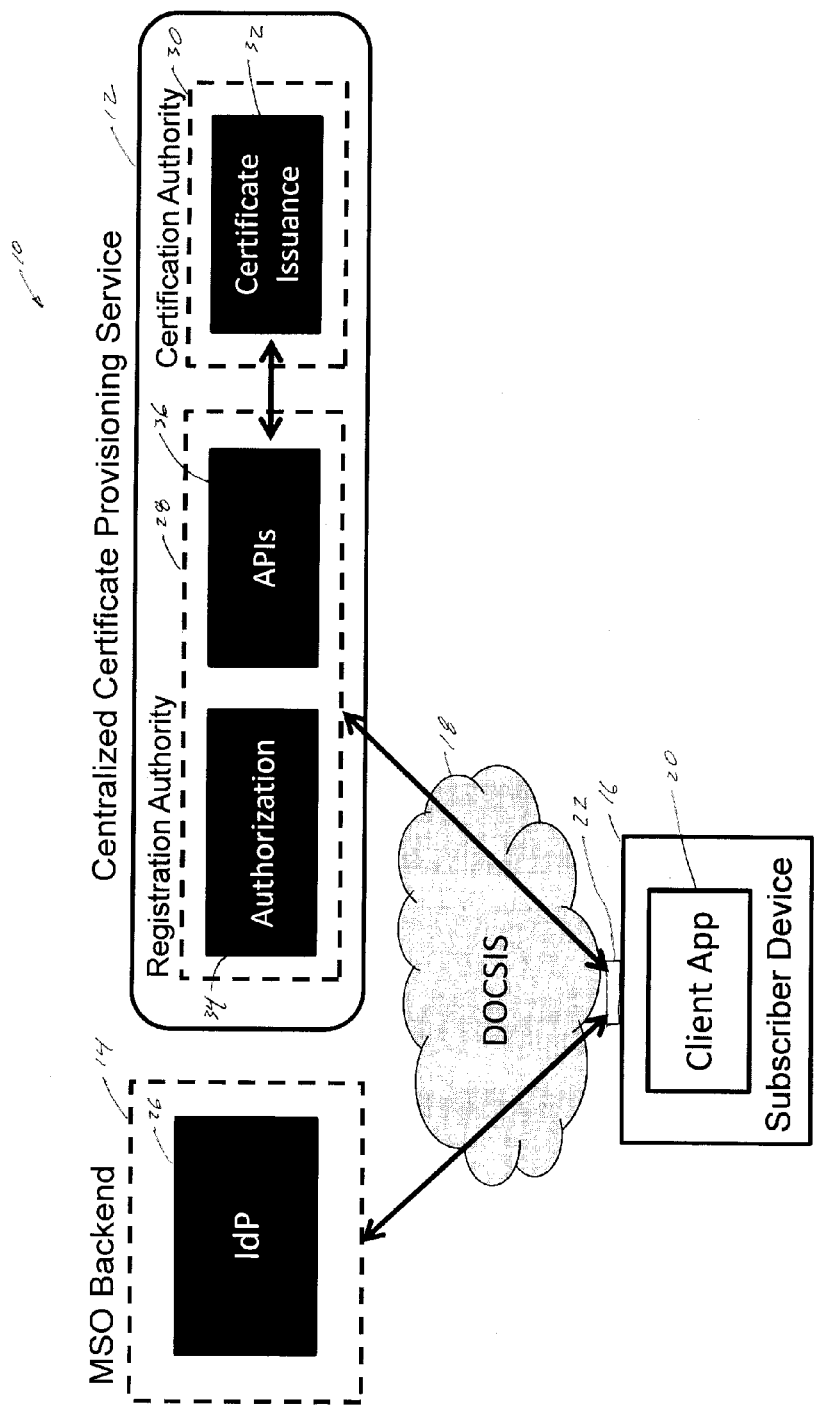
FIG. 1 illustrates a certificate provisioning system as contemplated by one non-limiting aspect of the present invention.

FIG. 1 illustrates a certificate provisioning system 10 as contemplated by one non-limiting aspect of the present invention. The system 10 is predominately described with respect to a centralized certificate provisioning service 12 relying on a multiple system operator (MSO) 14 when provisioning a device 16 with a certificate. The centralized certificate provisioning service 12 may rely upon the MSO 14 to verify an identity of a subscriber associated with the device 16 in order to ameliorate its own processing when provisioning the device 16 with a certificate. The present invention particularly contemplates the centralized certificate provisioning service 12 relying on the MSO 14 to test for the presence of a trusted connection between the MSO 14 and the device 16 to represent its level of trust with the device 16. The centralized certificate provisioning service 12 may then rely upon the MSO's determination of trust when provisioning the device 16 with a certificate. This reliance on the MSO's determination of trust may be beneficial in ameliorating processing demands on the centralized certificate provisioning service 12 and/or to ameliorate inputs and other operations which may be required by the subscriber to establish a similar level of trust directly between the device 16 and the centralized certificate provisioning service 12.

The device 16 may be any type of mobile or non-mobile device having capabilities sufficient to facilitate access to a private network 18 of the MSO 14 and/or the Internet through either an access point 22, which may be a cable modem, a Wi-Fi router, a cellular tower, etc. The device 16 may be a cellular phone, mobile phone, computer, laptop, tablet, personal digital assistant (PDA), set top box (STB), media terminal adapter (MTA), etc. While the description is predominately set forth with respect to a single device 16, the present invention fully contemplates its use with any number of devices 16, including simultaneously supporting provisioning of any number of devices 16 through any number of access points. The device 16 may include a client application 20 embodied in a computer-readable medium having stored thereon a plurality of instructions including instructions which, when executed by a processor, cause the processor to facilitate the operations contemplated by the present invention. The client application 20 or other feature of the device 16, for example, may be a certificate provisioning application having capabilities sufficient to facilitate managing certificates and facilitating provisioning of the certificates according to the operation set forth herein.

The access point 22 may correspond with a Data Over Cable Service Interface Specification (DOCSIS) cable modem (CM). The cable modem 22 may be deployed to the subscriber's home and assigned an IP address, a MAC address, or other suitable address by a DHCP server or other entity associated with the MSO 14, optionally prior to the cable modem being enabled to communicate with the MSO 14. When the cable modem 22 connects to the MSOs network 20 it may need to be securely authenticated before the address is assigned, which may optionally include some reliance on the access point having a certificate. In some cases, the access point may be required to request or to be assigned an address each time it boots up, i.e., not just when it is first installed. Either at the time of subscriber sign-up, during installation of the cable modem 22 at subscriber's home, or elsewhere, the subscriber's username and password may be associated with the address provided to the cable modem 22. The address assigned to the cable modem 22 may be fixed by the MSO 14 or otherwise tracked by the MSO 14. A similar type of address may be associated with the device 16 such that at the time of sign-up or at some point thereafter the MSO 14 may be able to generate a cross-reference or other relationship between the addresses of the device 16 and the cable modem 22 with the user (i.e., the username and password).

When the device 16 is connected to the cable modem 22, the MSO 14 can cross-reference the address of the device 16 with the address of the cable modem 22, and if that addresses match with those pre-associated with each other, the MSO 14 can be relatively confident that the device 16 is authenticated for use with the cable modem 22 and that it is not some other cloned or on unauthorized device attempting to illegitimately access MSO's services. The subscriber may be required to input the pre-associated username and password through the access point for verification by the MSO 14. The relationship between the user, username and password, device address and/or cable modem address provides a certain level of trust, particularly when coupled with the secure provisioning of the cable modem 22 to the subscriber's home by a technician within the employ or trust of the MSO 14. The MSO 14 is uniquely positioned to be the only entity in possession of each of these pieces of information since it is unlikely that an MSO 14 or other similar type of service provider would disclose addresses of its cable modems 22 or other access points to another entity for use in trust verifications.

One non-limiting aspect of the present invention contemplates relying on this type of two-factor authentication (e.g., username and password coupled with trusted access point addresses) to provide a heightened sense of security. Once the device 16 successfully completes this or similar type of two-factor or other multi-factor authentication, it may be considered by the MSO 14 to be trusted such that it may now be allowed to access proprietary or subscription-based services of the MSO 14. In addition to or in place of being granted access to MSO services, the trusted device 16 may be provisioned with certain security capabilities, such as assertions, certificates, entitlements, etc. The MSO 14 may provide the device 16 with an assertion or other representation of its trust. This assertion may be used by the device 16 when attempting to gain a certificate from the centralized certificate provisioning service 12. The centralized certificate provisioning service 12 is shown in FIG. 1 to be distinct from the MSO 14 as one non-limiting aspect of the present invention contemplates the centralized certificate provisioning service 12 being a third-party entity or service independent of the MSO 14, i.e., the centralized certificate provisioning service may be unaware or not provided with the addresses associated with a trusted access points of the MSO 14 and/or the username and passwords provided by the MSO 14 to its subscribers.

Rather than exposing or requiring the centralized certificate provisioning service 12 to track trusted addresses or trusted username and passwords, the centralized certificate provisioning service 12 may rely on an assertion or other representation to be provided from the device 16 according to a previous authentication with the MSO 14. This reliance on the MSO 14 to perform part of the authentication or verification process is believed to be particularly advantageous since the MSO 14 is uniquely positioned to test for its trust with the device 16. This allows the certificate to be provisioned optionally without having to unduly burden the associated subscriber, e.g., without requiring the subscriber to continuously input its username and password or other security-related information when attempting to access services of the MSO 14 and when attempting to be provisioned by the centralized certificate provisioning service 12. The unique positioning of the MSO 14 to assess trust can also be beneficial in ameliorating the processing of the centralized certificate provisioning service 12 since the assertions provided by the MSO 14 may be a generic assertion (e.g. the same for all devices trusted by the MSO 14) or provided according to various classifications (e.g. the MSO 14 may have a limited number assertion classifications representative of a level of trust or subscription purchases).

The centralized certificate provisioning service 12 can issue certificates based on the generic assertion or classification of the assertion. This can be helpful in allowing the certificates to be issued without centralized certificate provisioning service 12 having to determine the level of trust that should be assigned to the device 16, i.e., it can rely on the MSO 14 to assign the level of trust. In the event the MSO 14 issues generic assertions or a limited number of assertion classifications, the centralized certificate provision service 12 can match certifications to each of the available assertions. This frees the centralized certificate provision service 12 from having to individually identify the level of trust to be provided to device according to other factors, such as an assessment of a username and password. The centralized certificate provision 12 service may be configured to facilitate issuing certificates a priori, such as based on username and password inputs and other subscriber directed inputs, however, this capability would require the centralized certificate provision service 12 to include a larger database of permissions since it would require additional tracking and monitoring in order to insure the proper certificates were issues.

FIG. 1 illustrates the MSO 14 as having an identity provider (IdP) 26. The IdP 26 may be configured to facilitate identification related operations between the MSO 14 and the subscriber and/or the device 16. The IdP 26 may be configured to keep track of a range of addresses trusted by the MSO 14 for use in assessing whether the device 16 is currently communicating through one of the trusted access points 22. The IdP 26 may be configured to determine an access point 22 to be trusted in the event an address of the access point 22 falls within a range of trusted addresses of the MSO 14. In order to be considered as an address within the range of trusted addresses, the corresponding address may be input to the IdP 26 by a technician responsible for deploying the corresponding access point 22 in the field, e.g., an additional human factor may be required in order for the access point 22 to be considered as trusted in order to thwart the use of addresses which have not been associated with access points 22 deployed in the field. While the MSO 14 is shown to only include the IdP 26, the MSO 14 may include any number of other devices, networks, and the like to facilitate its corresponding operations and services. The MSO 14 may be configured with additional features depending on its provide services, which may include but are not limited to those associated with a cellular phone provider; a high-speed data provider; a cable, broadcast, or satellite television service provider; a voice over Internet protocol (VoIP) provider; etc.

The centralized certificate provisioning service 12 is shown to be comprised of a registration authority (RA) 28 and a certification authority (CA) 30. The CA 30 may include a certificate issuance agent 32 configured to issue certificates to the RA 28 and/or directly to the device 16. The certificate issuance agent may be configured to issue any type of certificate or levels of certification depending on trust established with the device 16, e.g., according to a level of trust determined for the assertion provided from the device 16, which may be related to a level of trust with the MSO 14. The certificate issuance agent 32, for example, may have different levels of trust with different MSOs and/or it may be configured to provide different levels of certification depending on the MSO 14 associated with the assertion provided from the device 16. The RA 28 may be comprised of an authorization agent 34 and application program interfaces (APIs) 36 to facilitate generating authorizations and facilitating interactions between the device 16 and certificate issuance agent 32. The centralized certificate provisioning service 12 may be configured to facilitate public-private key certificates (e.g., Ron Rivest, Adi Shamir and Leonard Adleman (RSA)), a public key infrastructure (PKI), etc.

Figure 2:
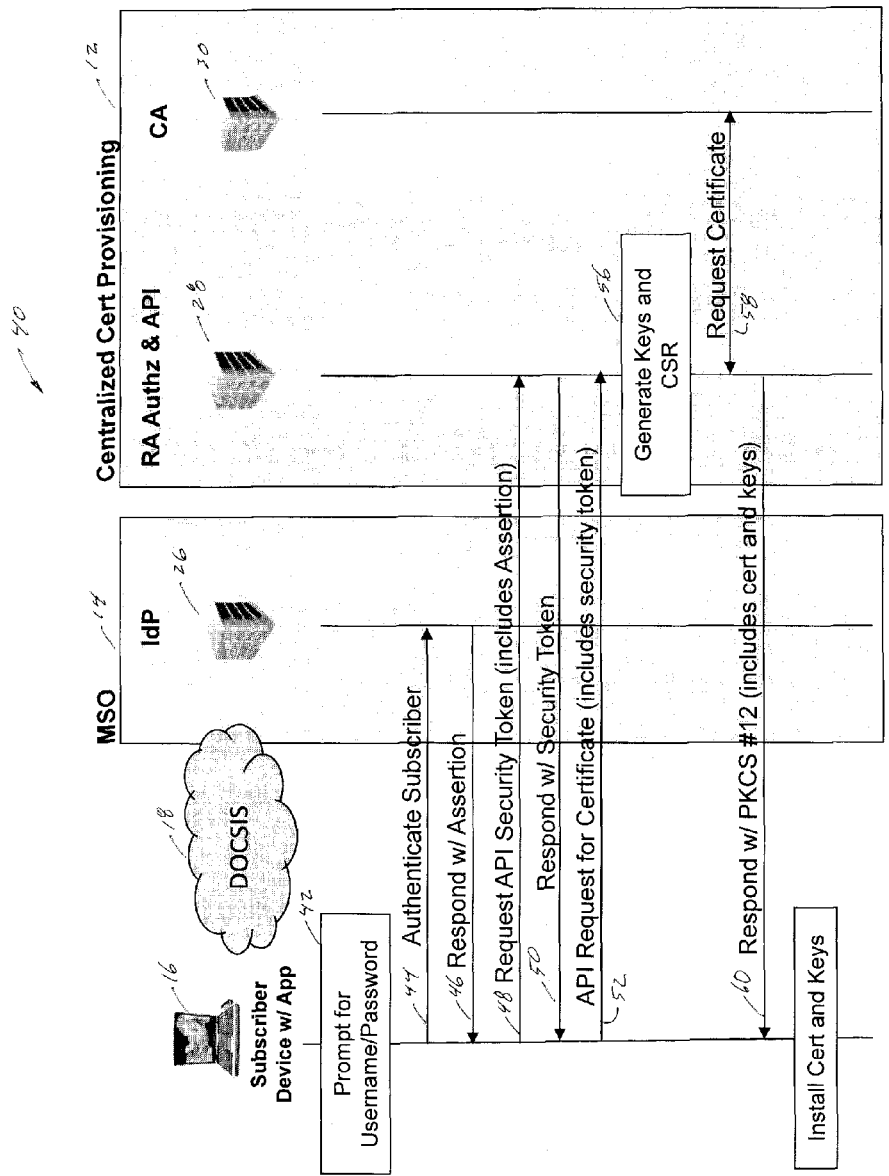
FIG. 2 illustrates a messaging diagram for provisioning a device in accordance with one non-limiting aspect of the present invention.

FIG. 2 illustrates a messaging diagram 40 for provisioning a device in accordance with one non-limiting aspect of the present invention. The message diagram relates to provisioning the device with a certificate. The certificate may relate to any type of dataset sufficient for use by the device in identifying itself or assessing a level of trust assigned to it, such as but not limited to X.509 or DSA certificate data formats. The messaging diagram 40 is predominately described with respect to the device 16 being associated with a MSO 14 where a prior relationship has been established, as such as subscriber relationship, where the MSO 14 has associated a username and password or other personally identifying combination with the subscriber operating the device 16. This pre-defined relationship may occur at the time of the subscriber making a contract obligation to the MSO 14 and the MSO 14 in turn allowing the subscriber access to particular services. The messaging diagram 40 is also predominately described with respect to the device 16 at least initially accessing services of the MSO 14 through a cable modem over a DOCSIS network 18 or other proprietary network of the MSO 14 in order to facilitate establishing a level of trust.

This description, however, is provided for exemplary non-limiting purposes as a present invention fully contemplates its use and application in other environments and through other types of access points where the relationship may be pre-defined between an operator access point and the subscriber.

Block 42 relates to a subscriber engaging a certificate provisioning application 20 on the device 14 while the device 14 is connected to an access point 22, e.g., a cable modem or Wi-Fi router. The certificate provisioning application 20 may prompt the user to input a username and password combination or other personally identifying combination previously associated with the user and the MSO 14. The information may be input through display or other input associated with the device 16. Upon receipt of the username and password, the device 16, or more particularly the certificate provisioning application 20, may transmit and authenticate subscriber request 44 to an IdP 26 of the MSO 14. The authenticate subscriber request may include credentials relating to identify information of the subscriber and/or the device 16. The credentials may include the username and password input and Block 42 and/or an address associate with the device 16 or access point 22 through which the authenticate subscriber request is transmitted. The credentials may be transmitted according to any suitable protocol or messaging standard, including a messaging standard the protocol proprietary to the MSO 14. The IdP 26 may process the credentials to assess a level of trust with the subscriber and/or device 16.

The IdP 26 may instigate a two-factor authentication process where it verifies or otherwise assesses at least two pieces of information from the device 16 prior to determining the level of trust or whether the device 16 successfully passes the two-factor authentication process. The username and password and address of the access point 22 may comprise the two pieces of information used to perform the two-factor authentication. The IdP 26 may assess the username and password input to the device 16, referred to herein as a credentials username and password, to determine whether it matches with a username and password previously associate with the subscriber, referred to herein as a trusted username and password. In the event the username and password match, the IdP 26 may determine the device 16 to have passed a first one of the two-factor authentication tests. The IdP 26 may then assess whether the authenticate subscriber request was transmitted through an access point 22 having an address within a range of trusted addresses. The range of trusted addresses may correspond with access points 22 or other communication mediums associate with the MSO 14 that are trusted or otherwise known to be valid for use with the subscriber and/or pre-associated with the subscriber as likely points through which communications may be made.

The IdP 26 may issue a response message 46 with an assertion in the event the two-factor authentication process or other authentication process is successfully completed. This assertion may represent the MSO's 14 level of trust with the subscriber and/or device 16. The assertion may include attributes related to entitlements or other endowments purchased by the subscriber or otherwise allocated to the subscriber that are reflective of the subscriber's contractual commitments with the MSO 14 or other contractual commitments for services provided through other MSOs or from other service providers. The assertion may take the form of a set of data asserting that the holder/user has been authenticated by the IdP 26 and may include additional information for authorizing certificate provisioning services. In the event the device 16 should fail to pass any portion of the two-factor authentication tests, the IdP 26 may deny delivery of the assertion and/or require the subscriber to perform other operations in order to obtain the assertion, such as by contacting customer support or dispatching a technician.

Upon receipt of the assertion, the device 16 may transmit a certain security token request 48 to the RA 28. The security token request may include the assertion provided by the MSO. The RA 28 may assess the assertion to determine whether the MSO 14 associated therewith or other identifying characteristics of the assertion. The RA 28 may then rely on this assessment to determine whether a trusted relationship has been established of the type sufficient to warrant issuing a security token to be used in subsequently requesting a certificate. The RA 28, for example, may be configured to keep track of relationships with various MSOs 14 such that it may issue different security tokens depending on the identified MSO 14 or other permissions associated with issuing security tokens according to permissions specified within the assertion or otherwise associated with the identified MSO 14. In the absence of such a relationship, the RA 28 may prompt the subscriber for additional information or request the identified MSO 14 to provide additional information sufficient to assess whether the security token should be provided.

In the event there is a sufficient relationship, the RA 28 may issue a security token response 50 having the security token. The security token may take the form of a set of data that enables the client application 20 to access the RA APIs 28. The security token response may be necessary to provide the security token so that the RA APIs 28 will avoid rejecting a certificate request that is to be subsequently issued from the device 16 in order to request the actual certificate. This may be necessary since the RA APIs 28 may be configured to deny any certificate request if the request fails to include a valid security token issued by the authorization server 28. The present invention contemplates facilitating management in transmission of the certificates according to various standards and protocols such as but not necessary limited to RFC 4210 Certificate Management Protocol, RFC 5272 Certificate Management over CMS and Simple Certificate Enrollment Protocol (SCEP), the disclosure of which are hereby Incorporated by reference in their entirety.

Upon receipt of the security token, the device 16 may transmit a certificate request 52 to the RA to request provisioning of a certificate. The RA 28 at Block 56 may generate keys and a certificate signing request (CSR). This process may include the RA 26 transmitting a certificate request to the CA 30 in a session 58. The CA 30 may then respond with a corresponding certificate. This certificate may be transmitted from the RA 28 to the device 16 in a certificate message 60. While the present invention illustrates the CA 30 being separate from the RA 28, the present invention is not necessarily so limited and fully contemplates a single entity integrating both features. The RA 28 and the CA 30 are shown to be separate since it is contemplated that it may be advantageous if the CA 30 manages the security and issuance of certificates and the RA 28 authorizes the entities that are authorized to receive those certificates. In this manner, the RA 28 may be associated with a service provider of the device 16 and/or subscriber and the CA 30 may be an independent third-party, such as Verisign.

Upon receipt of the certificate message having the certificate, the device 16 may install the certificate in any corresponding keys or other entitlements provided from the CA 30, which are collectively referred to herein as the certificate. The certificate may be stored within the computer-readable medium of the device 16 for use in presenting trusted information to the entities is with which the device communicates. The certificate, for example, may include a public and private key specific to the device along with additional information, such as information regarding the entity issuing the certificate, a Mac address of the device, and other entities issue related keys.

As supported above, the present invention contemplates an architecture/method to provision certificates to subscriber devices which provides a strong authentication credential that can be used to automatically authenticate subscribers to MSO services. This invention may be used to provide automated login using username/password credentials without subscribers having to keep track of and input username and passwords that are vulnerable to a number of attacks.

One non-limiting aspect of the present invention contemplates the subscriber downloading a certificate provisioning application on to their device from an MSO website. The application may then prompt the subscriber for their service account username and password. The application can download the subscriber certificate and install it on the device. The certificate can then be used to automatically authenticate the subscriber when accessing online services (e.g. video, Wi-Fi access, etc.) and other types of services.

Optionally, the subscriber can download a certificate provisioning client application from the MSO's website. Certificate provisioning functionality can be implemented by a standalone application or embedded in another type or app (e.g. connection manager). When the subscriber starts the application they can be prompted for their account username/password credentials. The application can send the credentials to the MSO's IdP for subscriber authentication. The IdP can validate the username/password and that the request came from a trusted DOCSIS IP address (two factor user authentication). The IdP can create a Security Assertion Markup Language (SAML) assertion and responds back to the application. The application can then send the SAML assertion to the centralized RA authorization entity using an OAuth request. The authorization entity can validate that the subscriber was authenticated by a trusted MSO IdP and responds with a security token. The application can send a certificate request to the RA API with the security token using an OAuth. The API can validate the security token, generate a key pair, create a CSR, and send a certificate request to the CA using the SCEP protocol. The CA can issue the certificate and sends it to the API. The API can respond to the application request with the certificate and private key in public-key cryptography standards (e.g., PKCS #12) format. The application can install the certificate in the device so that it can be used for subscriber authentication.

The client application configuration parameters may include: MSO IdP subscriber authentication API URL; centralized certificate provision universal resource locators (URLs) for authorization API and service APIs; CA certificates; root CA certs for MSO IdP and centralized RA; and/or any intermediate CA certs that issue the subscriber certificate can be included in the PKCS #12 response. The server configuration parameters may include: MSO IdP—subscriber credential database location, trusted source IP address range/subnet; RA authorization entity—IdP root CA cert, shared secret w/RA API entity; and/or RA API entity—shared secret w/RA authorization entity. The security considerations may include: API requests to the MSO IdP and the RA being protected by transport layer security (TLS) to help prevent hackers from capturing the security tokens and making an unauthorized request; and/or security strengthening of tokens to guide lifetime settings optionally with weaker tokens should have shorter lifetimes.

Revoking/updating of the RA root CA certificate can be accomplished by downloading an update for the client application that contains a new RA root CA certificate. The centralized RA can maintain a revocation data store of the certificates it provisions. Applications/websites using subscriber certificates for authentication can check revocation status by downloading a certificate revocation list (CRL) or accessing an online certificate status protocol (OCSP) interface at the RA. The client application can periodically check the validity date of the subscriber certificate. When it is about to expire the client application can start the certificate provisioning process again. If the certificate has not yet expired it can be used to authenticate with the IdP without having the subscriber to enter credentials. The old certificate and key can be replaced with the new ones.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for provisioning a device with a certificate comprising:

receiving credentials transmitted from the device through an access point, the credentials identifying a credentials username and password;

verifying whether the credentials are trusted according to a two-factor authentication process, the two-factor authentication process determining:

i) the credentials to be trusted in the event (i) the credentials username and password match with a trusted username and password previously associated with the device and (ii) an address associated with the access point is within a range of trusted addresses;

ii) the credentials to be untrusted in the event the username and password fail to match with the trusted username and password or the address fails to fall within the range of trusted addresses;

providing the device with an assertion in the event the credentials are trusted, the assertion being sufficient for the device to request the certificate;

preventing delivery of the assertion to the device in the event the credentials are untrusted until the device transmits trusted credentials;

wherein the certificate is provided from a certificate authority (CA) upon receipt of a security token included with a certificate request transmitted from the device, the security token being required by the CA prior to providing the certificate to the device; and the security token being provided to the device from a registration authority (RA) upon receipt of the assertion being included within a security token request transmitted from the device, the assertion being required by the RA prior to providing the security token to the device.

2. The method of claim 1 further comprising the CA providing the certificate without being provided the username and password associated with the device.

3. The method of claim 1 further comprising the CA providing the certificate without the certificate request identifying the username and password associated with the device.

4. The method of claim 1 further comprising the RA providing the security token to the device without being provided the username and password associated with the device.

5. The method of claim 1 further comprising the RA providing the security token to the device without the security token request identifying the username and password associated with the device.

6. The method of claim 1 further comprising an identity provider (IdP) determining the address to be trusted in the event the address is within the range of trusted addresses designated by a service provider to be trusted and the IdP determining the address to be untrusted in the event the credentials address fails to be within the range of the trusted addresses.

7. The method of claim 6 further comprising the IdP associating the trusted username and password with the device and determining whether the credentials username and password match with the trusted username and password.

8. A method for provisioning a device with a certificate comprising:
receiving a certificate request from the device, the certificate request including a security token previously provided to the device after successfully completing a two-factor authentication process;
providing the certificate to the device in the event the security token indicates the two-factor authentication process was completed by a trusted entity;
denying the certificate to the device in the event the security token fails to indicate the two-factor authentication process was completed by a trusted entity;
providing the security token to the device upon receipt of a security token request having an assertion, the assertion being provided to the device from the trusted entity after successfully completing the two-factor authentication process;
the assertion being provided to the device from an identity provider (IdP), the security token being provided to the device from a registration authority (RA), and the certificate being provided from a certificate authority (CA);
the IdP performing the two-factor authentication process and providing the assertion upon receipt of credentials transmitted from the device through an access point, the credentials identifying a credentials username and password input to the device by a user while connected to the access point;
the IdP determining the two-factor authentication process to be successful in the event (i) the credentials username and password match with a trusted username and password previously associated with the device and (ii) an address associated with the credentials access point is within a range of trusted addresses; and
the IdP determining the two-factor authentication process to be unsuccessful in the event the username and password fail to match with the trusted username and password or the address is not within the range of trusted addresses.

9. The method of claim 8 further comprising the CA providing the certificate without being notified of the credentials username and password and the RA providing the security token without being notified of the credentials username and password.

10. A non-transitory computer-readable medium having computer-readable code embodied therein for controlling a computing device to electronically facilitate certificate provisioning, the computer-readable code comprising instructions for:
transmitting an authentication request with credentials to request an assertion, the credentials sufficient for use in a two-factor authentication process;
receiving an assertion upon successfully completing the two-factor authentication process, the two-factor authentication being successfully completed if a credentials username and password is verified and the credentials are transmitted through an access point having an address within a range of acceptable address;
transmitting a security token request with the assertion to request a security token;
receiving the security token upon verification of the assertion;
transmitting a certificate request with the security token to request the certificate;
receiving the certificate upon verification of the security token; and
provisioning the computing device with the certificate.

11. The computer-readable medium of claim 10 wherein the computer-readable code further comprises instructions for requesting user input of the credentials username and password.

12. The computer-readable medium of claim 11 wherein the computer-readable code further comprises instructions for identifying the address of the access point through which the credentials are transmitted.

13. The computer-readable medium of claim 10 wherein the computer-readable code further comprises instructions for transmitting the credentials to an identity provider (IdP).

14. The computer-readable medium of claim 13 wherein the computer-readable code further comprises instructions for transmitting the assertion to a registration authority (RA) without identifying the credentials username and password within the security token request.

15. The computer-readable medium of claim 14 wherein the computer-readable code further comprises instructions for transmitting the security token to a certificate authority (CA) without identifying the credentials username and password within the certificate request.

* * * * *